(12) United States Patent
Schulz et al.

(10) Patent No.: US 8,596,531 B2
(45) Date of Patent: Dec. 3, 2013

(54) FLUID INGRESS RESISTANT MAGNETIC STRIPE READER ASSEMBLY

(71) Applicant: VeriFone, Inc., San Jose, CA (US)

(72) Inventors: Christian E. Schulz, Rocklin, CA (US); Mehran Mirkazemi-Movd, Rocklin, CA (US)

( * ) Notice: Subject to any disclaimer, the term of this patent is extended or adjusted under 35 U.S.C. 154(b) by 0 days.

(21) Appl. No.: 13/723,628

(22) Filed: Dec. 21, 2012

(65) Prior Publication Data

US 2013/0112749 A1    May 9, 2013

Related U.S. Application Data

(63) Continuation of application No. 11/600,308, filed on Nov. 14, 2006, now abandoned, and a continuation of application No. 13/207,359, filed on Aug. 10, 2011, now abandoned.

(51) Int. Cl.
*G06K 15/00*    (2006.01)

(52) U.S. Cl.
USPC .......................................................... 235/383

(58) Field of Classification Search
USPC .......................................................... 235/383
See application file for complete search history.

(56) References Cited

U.S. PATENT DOCUMENTS

| | | | |
|---|---|---|---|
| 5,698,832 A * | 12/1997 | Someya et al. | 235/449 |
| 6,176,426 B1 * | 1/2001 | Kanayama et al. | 235/449 |
| 6,601,765 B2 * | 8/2003 | Yuan | 235/449 |
| 2011/0290881 A1 * | 12/2011 | Shulz et al. | 235/449 |

* cited by examiner

*Primary Examiner* — Michael G Lee
*Assistant Examiner* — David Tardif
(74) *Attorney, Agent, or Firm* — Stein IP, LLC

(57) ABSTRACT

A magnetic stripe reader assembly for a point of sale terminal is provided. In some embodiments, the magnetic stripe reader assembly includes a holder configured to retain a magnetic head within the terminal and restrict access to electronic components.

8 Claims, 3 Drawing Sheets

FLUID INGRESS RESISTANT MAGNETIC STRIPE READER ASSEMBLY

CROSS-REFERENCE TO RELATED APPLICATION

This application is a continuation of U.S. patent application Ser. No. 11/600,308, filed Nov. 14, 2006, and Ser. No. 13/207,359, filed Aug. 10, 2011, entitled FLUID INGRESS RESISTANT MAGNETIC STRIPE READER ASSEMBLY, which claimed priority to U.S. Provisional Patent Application Ser. No. 60/737,120, entitled FLUID INGRESS RESISTANT MAGNETIC STRIPE READER ASSEMBLY, filed Nov. 15, 2005, each of which is hereby incorporated by reference in their entirety for any and all purposes.

BACKGROUND

Magnetic stripe reader (MSR) assemblies may be used in point of sale terminals, such as portable handheld devices that may be used in restaurants to apply charges to credit cards. These assemblies may be subjected to harsh environments, such as dust and fluid spills. Typical MSR assemblies have a through hole to the electronics compartment, which allows the magnetic head of the MSR assembly to make contact with a swiped magnetic card. This through hole is a natural ingress point for spilled fluids to enter the electronics compartment of the terminal. It is therefore desirable to have an MSR assembly design that reduces or eliminates the ingress of fluid and fine particles.

SUMMARY

The disclosed point of sale terminal includes an MSR assembly that isolates the mechanical interfacing components, magnetic head, and card, from the electrical components that could be damaged by contaminants, such as by fluid contact.

The advantages of the present invention will be understood more readily after a consideration of the drawings and the Detailed Description.

DETAILED DESCRIPTION

Figure 1:
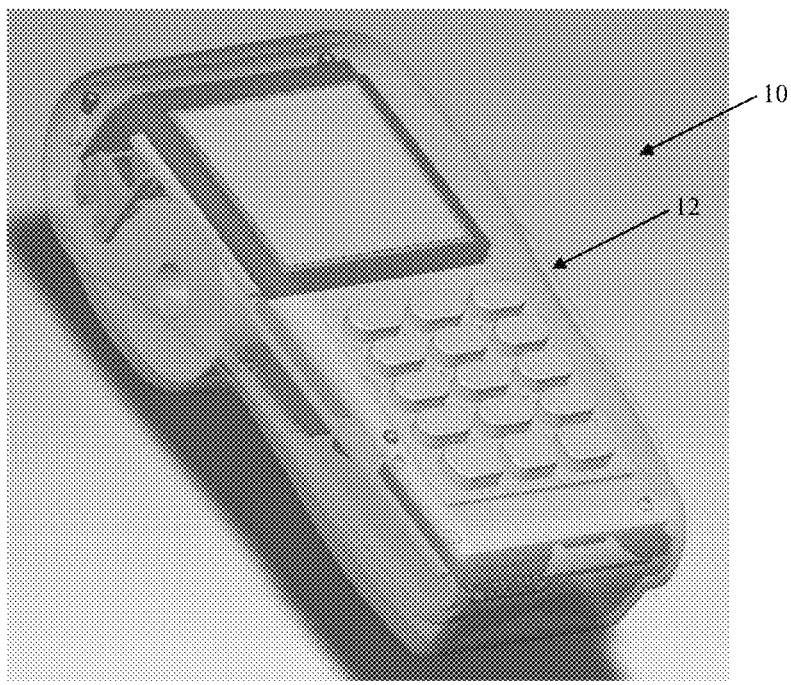
FIG. 1 is a sketch of an exemplary point of sale terminal.

An exemplary point of sale terminal housing 10 that includes a magnetic stripe reader (MSR) assembly 12 is shown in FIG. 1. The terminal has limited openings to restrict entrance of foreign materials, particularly fluids, which may damage the electronic components of the terminal.

Figure 2:
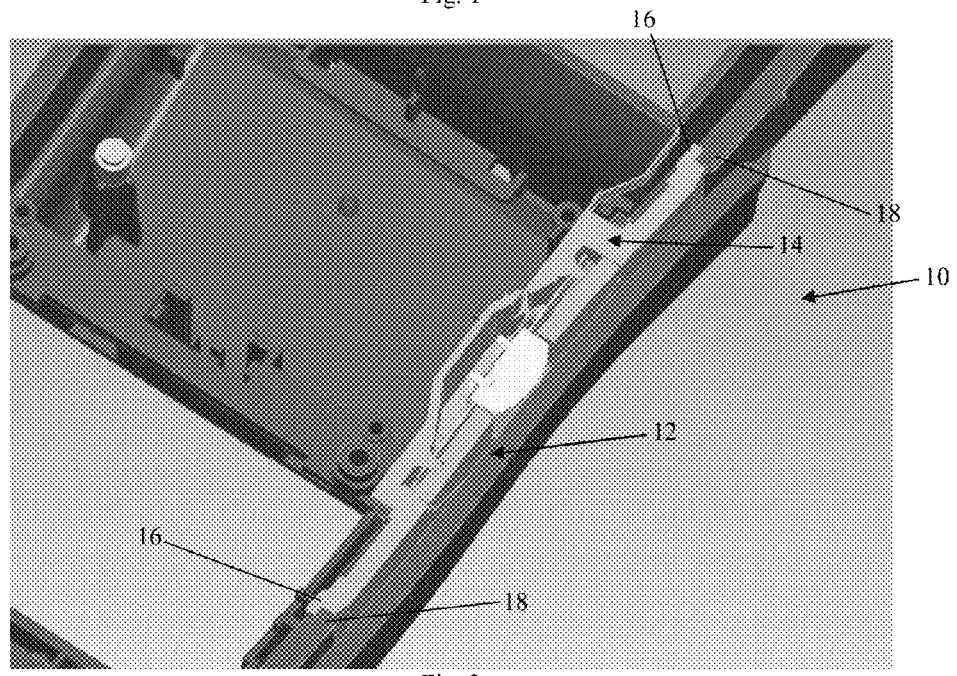
FIG. 2 is a cross-sectional view of an exemplary MSR assembly suitable for use with the terminal of FIG. 1.

As shown in FIG. 2, the MSR assembly may include a holder 14. The holder may be secured within the terminal by overlapping flanges 16, 18 having corresponding geometry. The flanges extend along at least a portion of the periphery of the holder. Such a configuration may reduce openings in the seams between the terminal and the MSR assembly that would otherwise allow fluids and other contaminants to pass into the electronics compartment. The holder therefore assists in positioning and retaining the MSR assembly within the terminal assembly. For example, the holder may slide into slots on mating top and bottom halves of the terminal. All edges of the holder may be seated against portions of the terminal to reduce gaps along the seam. The holder may be formed from any suitable material, such as plastic. The holder may provide a bottom and side positioning surfaces for swiping of a card.

Figure 3:
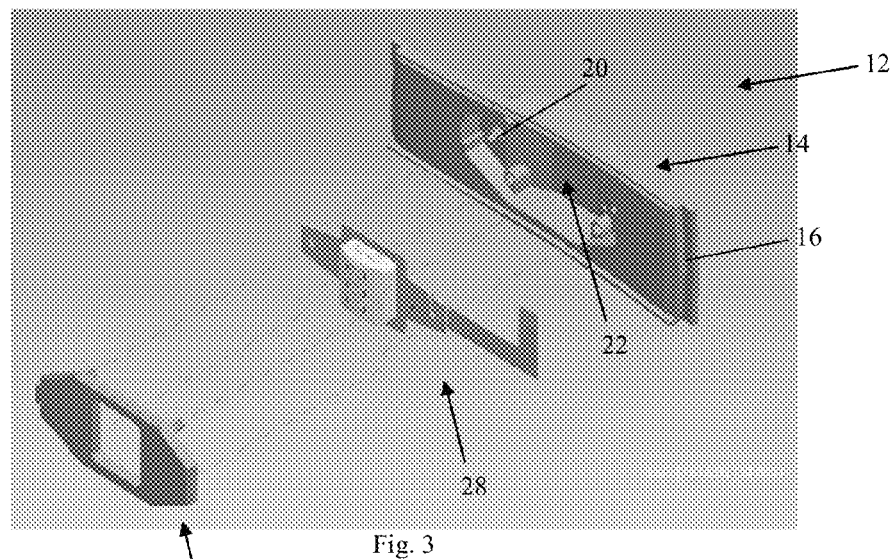
FIG. 3 is an exploded view of the of the MSR assembly shown in FIG. 2.
Figure 4:
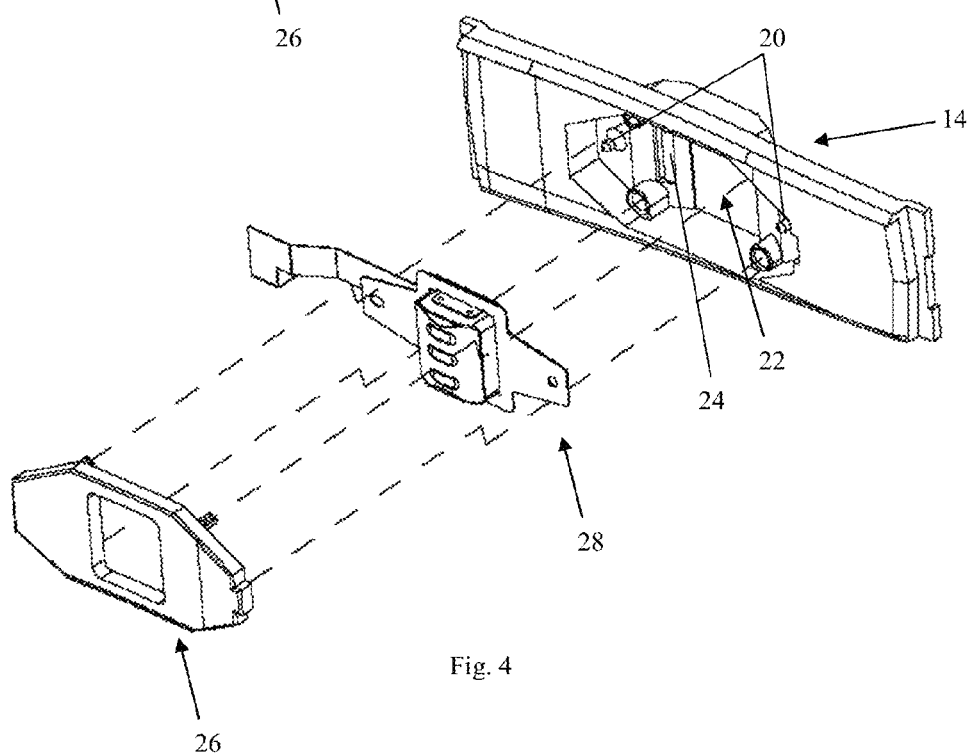
FIG. 4 depicts another embodiment of the MSR assembly.
Figure 5:
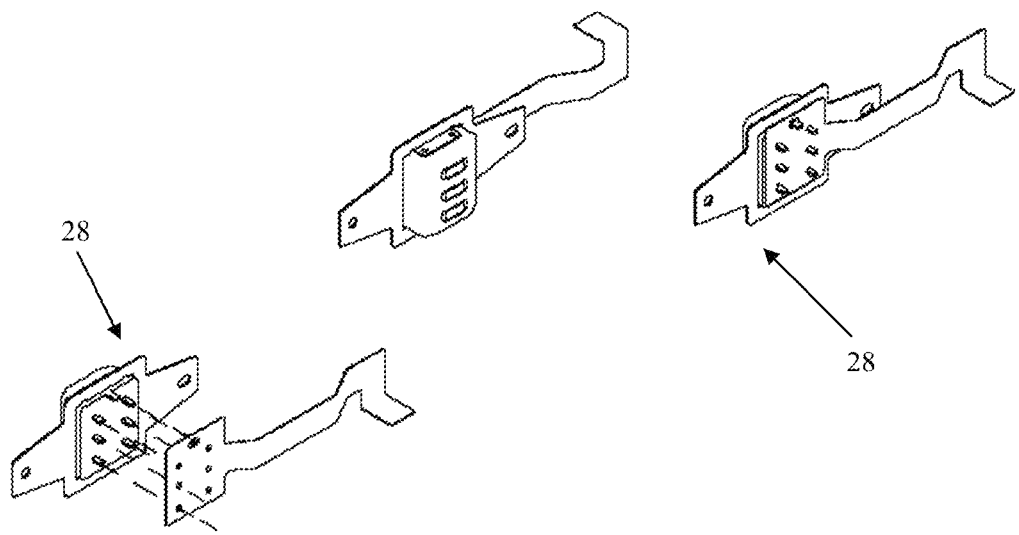
FIG. 5 illustrates a magnetic head and spring of the MSR assembly of FIG. 4.
Figure 6:
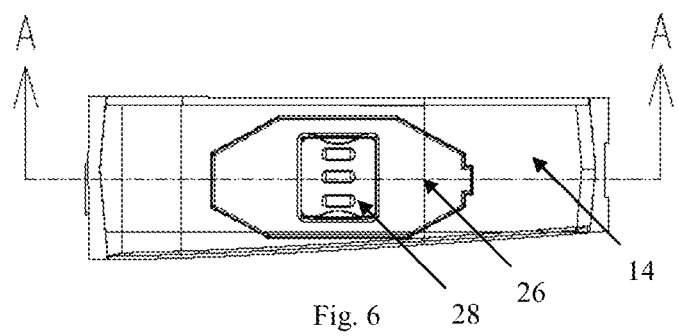
FIG. 6 is a front view of the MSR assembly of FIG. 4.
Figure 7:
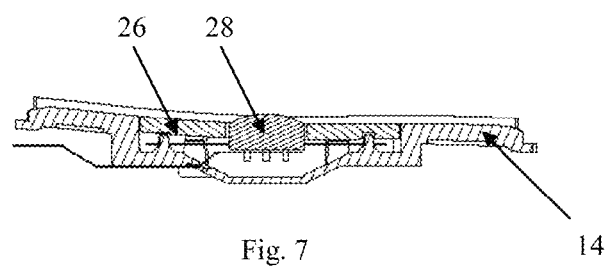
FIG. 7 is a top cross-sectional view of the MSR assembly of FIG. 4 along line A-A.

The holder may include an alignment assembly for locating the magnetic head of the MSR assembly within the terminal. For example, the holder may include locating pins 20 for the magnetic head, as shown in FIGS. 3 and 4. The pins may be integrally formed within the holder. Pins 20 may set the position of the magnetic head in all three dimensions.

The holder may include a cavity 22 in which the magnetic head may translate. The cavity may surround the magnetic head and isolate the head from the electronics compartment, thereby reducing or eliminating fluid ingress. The cavity includes an opening 24 to allow a flexible printed circuit board (FPCB) to pass through the holder and into the electronics compartment. The opening may be offset from the lower surface of the cavity so that the cavity must fill with a substantial amount of fluid before the fluid reaches the opening and passes into the electronics compartment. In some configurations, the back side of opening 24 may include a flat area for placement of a flat gasket to provide further protection against fluid ingress. The gasket may be slid onto the FPCB and adhered to the back of the cavity.

The MSR assembly may be curved to correspond to the shape of the terminal. The card swipe path may therefore be curved and the overall size of the terminal reduced for improved ergonomics.

The cover 26 may provide a method for capturing the magnetic head and spring assembly within the holder. For example, cover 26 may retain the magnetic head on locating pins 20 of the holder. The cover may be configured to be inset within the holder to provide a smooth continuous bearing surface for swiping a card past the magnetic head.

The cover may be ultrasonically welded to the holder to permanently bond the cover to the holder. The cover may assist in reducing the amount of fluid ingress into the cavity of the holder. The cover may reduce exposure of the magnetic head and spring assembly to physical damage from tools, dirt, misaligned cards, and the like.

As previously discussed, the MSR assembly includes a sensor 28 formed from a magnetic head with an integrated spring, as shown in FIGS. 3-7, that reads magnetic data from the card being swiped through the MSR assembly. This portion of the MSR assembly converts the magnetic data into an analog electronic signal, as is commonly used in the art.

Also previously noted, the MSR assembly includes a flexible printed circuit board (FPCB) to transmit the electronic signal from the MSR assembly to the electronics compartment. The FPCB may be soldered to the back of the magnetic head, routed through opening 24 in the back of the cavity in the holder, and coupled to a connector on a printed circuit board in the electronics compartment. The above-described gasket may be adhered to the back side of the holder cavity to further seal the cavity opening.

The disclosure provides a terminal for reading magnetic data from a card, the terminal comprising a terminal housing and a magnetic stripe reader, the magnetic stripe reader including a magnetic head and a holder adapted to retain the magnetic stripe reader within the terminal housing, wherein the holder has a geometry corresponding to that of an opening in the terminal housing.

In some configurations, the holder includes flanges that mate against corresponding flanges on the terminal housing.

In some configurations, the holder includes an alignment assembly adapted to position the magnetic head relative to the terminal housing.

In some configurations, the holder includes a cavity with an opening that is offset from the edges of the cavity.

In some configurations, the magnetic stripe reader assembly includes a cover adapted to retain the magnetic head within the holder.

The disclosure provides a terminal for reading magnetic data, the terminal comprising a magnetic stripe reader having a magnetic head adapted to read and convert magnetic data from a card, electronics configured to receive the converted data, a track configured to guide a card past the magnetic head, and a barrier configured to restrict access to the electronics.

In some configurations, the track is curved.

In some configurations, the barrier forms at least a portion of the track.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

Inventions embodied in various combinations and subcombinations of features, functions, elements, and/or properties may be claimed through presentation of new claims in this or a related application. Such new claims, whether they are directed to a different invention or directed to the same invention, whether different, broader, narrower or equal in scope to the original claims, are also regarded as included within the subject matter of the inventions of the present disclosure. The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed.

What is claimed is:

1. A portable point of sale terminal comprising:
   a housing;
   an electronics compartment within the housing;
   a magnetic stripe reader coupled to the housing, the magnetic stripe reader including a flexible printed circuit board to transmit an electronic signal to the electronics compartment, the reader including a holder secured within the terminal, wherein the holder includes a cavity in which a magnetic head is mounted for translational movement, the flexible printed circuit board including a first end coupled to the magnetic head in the cavity, the cavity surrounding the magnetic head to isolate the head from the electronics compartment, and further wherein the cavity includes an opening and the flexible printed circuit board is routed through the opening, and further including a gasket adhered to the holder at the opening and sealing the cavity opening where the flexible printed circuit board passes through, the opening allowing the flexible printed circuit board to pass through the holder and into the electronics compartment, while the gasket seals the opening and the flexible printed circuit board against fluid ingress into the electronics compartment.

2. The terminal of claim 1 wherein the opening is offset from the lower surface of the cavity.

3. The terminal of claim 1 wherein the gasket at the opening is substantially flat.

4. The terminal of claim 3 wherein the gasket is adhered to the back of the cavity.

5. The terminal of claim 1 wherein the housing includes flanges, and further wherein the holder includes flanges that mate against the flanges on the terminal housing.

6. The terminal of claim 1 wherein the holder includes an alignment assembly for locating a head of the magnetic stripe reader.

7. The terminal of claim 6 wherein the alignment assembly includes locating pins for the head.

8. The terminal of claim 7 wherein the pins are integrally formed within the holder.

* * * * *